United States Patent [19]

Koch

[11] 4,288,147
[45] Sep. 8, 1981

[54] ELECTRO-OPTICAL COMPOSITION OF THE GUEST-HOST TYPE

[75] Inventor: Gene C. Koch, Palo Alto, Calif.

[73] Assignee: Timex Corporation, Waterbury, Conn.

[21] Appl. No.: 128,770

[22] Filed: Mar. 10, 1980

Related U.S. Application Data

[63] Continuation-in-part of Ser. No. 971,625, Dec. 20, 1978, abandoned.

[51] Int. Cl.$^3$ .............................. G02F 1/13; C09K 3/34
[52] U.S. Cl. ................................. 350/349; 252/299.1; 252/408; 350/350 R; 260/396 R
[58] Field of Search .................. 252/299.1, 408, 299.5; 350/349, 350 R

[56] References Cited

U.S. PATENT DOCUMENTS

| | | |
|---|---|---|
| 1,735,432 | 11/1929 | Gunther . |
| 3,703,329 | 11/1972 | Castellano ........................ 252/299.1 |
| 3,833,287 | 9/1974 | Taylor et al. .................... 252/299.1 |
| 3,864,022 | 2/1975 | Moriyama et al. .............. 252/299.1 |
| 3,960,750 | 6/1976 | Moriyama et al. .............. 252/299.1 |
| 3,960,751 | 6/1976 | Moriyama et al. .............. 252/299.1 |
| 4,116,861 | 9/1978 | Aftergut et al. ................ 252/299.1 |
| 4,128,496 | 12/1978 | Cole, Jr. et al. ................ 252/299.1 |
| 4,128,497 | 12/1978 | Cole, Jr. et al. ................ 252/299.1 |
| 4,137,193 | 1/1979 | Osman ............................. 252/299.1 |
| 4,141,627 | 2/1979 | Bloom ............................. 252/299.1 |
| 4,145,114 | 3/1979 | Coates et al. .................... 252/299.1 |

FOREIGN PATENT DOCUMENTS

| | | |
|---|---|---|
| 2104 | 5/1979 | European Pat. Off. ......... 252/299.1 |
| 508395 | 10/1930 | Fed. Rep. of Germany . |
| 2815335 | 10/1978 | Fed. Rep. of Germany ... 252/299.1 |
| 2920730 | 11/1979 | Fed. Rep. of Germany ... 252/299.1 |
| 2037803 | 7/1980 | United Kingdom ............ 252/299.1 |
| 2045274 | 10/1980 | United Kingdom ............ 252/299.1 |

OTHER PUBLICATIONS

Constant, J. et al., "Photostable Anthraquinone Pleochroic Dyes," Presented at 7th Intern'l Liq. Cryst. Conf., Bordeaux, Fr. (Sep. 1978).
White, D. L. et al., J. Appl. Phys., vol. 45, No. 11, pp. 4718–4723, (1974).
Bloom, A. et al., Mol. Cryst. Liq. Cryst., vol. 40, pp. 213–221, (1977).
Uchida, T. et al., Mol. Cryst. Liq. Cryst., vol. 34, (Lett), pp. 150–158, (1977).

*Primary Examiner*—Teddy S. Gron
*Attorney, Agent, or Firm*—Edward J. Timmer

[57] ABSTRACT

The electro-optical composition comprises a host liquid crystal and guest dichroic dye which is characterized generally as a linear, noncondensed aromatic compound including one or more quinonoid rings as the chromophores or color-generating groups of the dye molecule. The dyes of the invention have a long, rod-like structure to provide a high order parameter and impart various characteristic colors to the composition. Liquid crystal display devices incorporating the electro-optical composition exhibit improved contrast.

16 Claims, 1 Drawing Figure

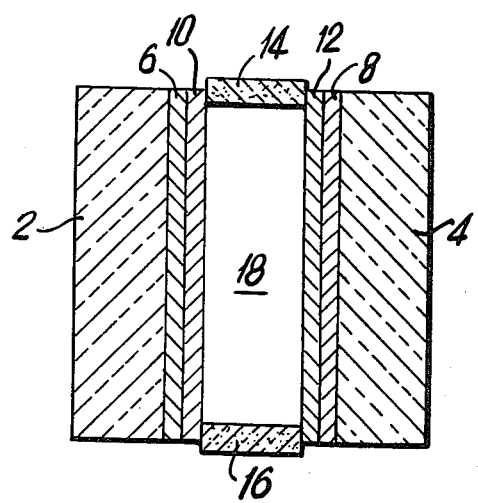

ELECTRO-OPTICAL COMPOSITION OF THE GUEST-HOST TYPE

This application is a continuation-in-part of application of U.S. Ser. No. 971,625 filed Dec. 20, 1978, now abandoned.

FIELD OF THE INVENTION

The present invention relates to liquid crystal display devices and, more particularly, to those of the guest-host type in which a dye is admixed with a liquid crystal material.

DESCRIPTION OF THE PRIOR ART

A display, particularly one of the liquid crystal type, can be characterized by brightness and contrast performance criteria. It is known to improve these performance criteria by dissolving a guest dichroic dye in a host liquid crystal material. Many dyes have been especially developed for a variety of applications such as dyeing of fabrics, printing of textiles, coloring of plastics, color image formation in photography, etc. To provide the requisite properties, such as hue, solubility, affinity for the substrate, chemical resistance, and compatibility with the medium from which the dye is applied, the molecular structure of the dye is specially designed for each application. Important dye properties required for the present application in liquid crystal displays include dichroism, high order parameter and solubility.

Dichroic materials display absorptive anisotropy, that is to say light whose electric vector is parallel to a preferred molecular axis of a dichroic molecule will be absorbed more strongly than light whose electric vector lies along other axes. More specifically, in positive dichroic dyes, such as those treated in the present invention, light which impinges on the dye molecule perpendicular to its long axes is absorbed more strongly than light which impinges on the molecule parallel to its long axis.

If such a positive dichroic dye is dissolved in a nematic liquid crystalline host, then the long axis of individual dye molecules will be constrained to align with the nematic director. When the nematic host material is aligned by either an external electric field or preselected boundary conditions in the display, the dye molecules are constrained to adopt the alignment of the liquid crystal. This effect is put to use in guest-host displays by using boundary conditions, such as by molecular ordering induced by an angularly deposited silicon oxide coating, to initially align the dye long axes in an absorbing direction and then imposing an electric field so as to rotate the dye long axes to a nonabsorbing direction, thereby altering the light absorbing properties of the display.

In order for this guest-host device to perform properly, the guest dye molecules must align well with the host nematic liquid crystal material.

The efficiency of this alignment is commonly determined by aligning a guest-host (dye-nematic liquid crystal) solution so that the absorption of polarized light beams whose electric vectors lie parallel and perpendicular to the long dye axis, respectively, can be measured and compared. The alignment efficiency can be expressed as an order parameter, S, which is give by:

$$S = \frac{A_{\|} - A_{\perp}}{A_{\|} + 2A_{\perp}}$$

where $A_{\|}$ and $A_{\perp}$ are, respectively, the absorbance for light polarized with electric vectors along the long axis and the absorbance for light polarized with electric vectors perpendicular to the long axis. The order parameter, however, is not solely dependent on the efficiency of the alignment of the guest dye with the nematic material but also depends on the intrinsic dichroic ratio of the dye molecules and the order parameter of the guest nematic material itself.

Experience with dichroic dyes for use in guest-host display devices has shown that generally the longer and more rod-like dye molecules are more likely to have high order parameters. For example, one type of dye capable of sufficiently high order parameters to yield displays with good viewing properties are azo dyes, for instance D-3 dye commercially available from British Drug House:

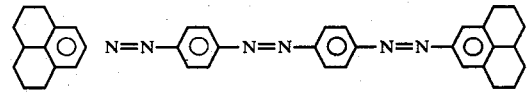

As described in the Aftergut et al patent, U.S. Pat. No. 4,116,861, issued Sept. 26, 1978, another dye which might exhibit a sufficiently high order parameter is a stilbene-derived dichroic dye, for example, of the following structure:

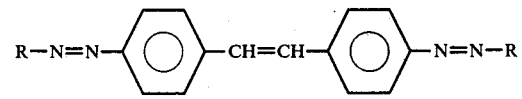

Solubility of the dichroic dye in the liquid crystal must be sufficiently high so that thin layers, for example, of ten to fifteen microns, have adequate ligh absorption in one of the oriented states.

Liquid crystal-dye compositions utilized in electro-optical displays are discussed in the Goldmacker et al patent U.S. Pat. No. 3,499,702 issued Mar. 10, 1970; Castellano patent, U.S. Pat. No. 3,579,044 issued Aug. 3, 1971; Castellano patent, U.S. Pat. No. 3,703,329 issued Nov. 21, 1972; Hatfield et al patent, U.S. Pat. No. 3,837,730 issued Sept. 24, 1974; Moriyama et al patent, U.S. Pat. No. 3,864,022 issued Feb. 4, 1975; Moriyama et al patent, U.S. Pat. No. 3,960,751 issued Sept. 1, 1976; Constant et al patent U.S. Pat. No. 4,032,219 issued June 28, 1977 and Bloom patent, U.S. Pat. No. 4,032,470 issued June 28, 1977.

SUMMARY OF THE INVENTION

It is an object of the invention to provide an electro-optical composition comprising a host liquid crystal and a guest dichroic dye admixed therein, the dye molecules being long and rod-like so as to exhibit a high order parameter and being adequately soluble in commonly used liquid crystals or mixtures thereof for display purposes.

It is another object of the invention to provide an improved electro-optical display by virture of the incorporation of the aforementioned electro-optical composition therein.

In the electro-optical composition of the invention, the host liquid crystal may include conventional and well known materials such as nematic and cholesteric liquid crystals and their mixtures while the guest dichroic dye is characterized generally as a linear, noncondensed aromatic compound which includes a quinonoid ring as the chromophore (that is, as the color-generating group). The inventive dichroic dye is selected from a compound represented generally by the formula:

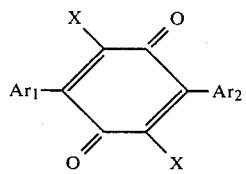

where $Ar_1$ and $Ar_2$ can be the same or different mono or polycyclic aromatic ring system which may include one or more additional quinonoid rings and/or hetero atoms and where X is a monovalent blocking substituent which is not fused to the adjacent aromatic radical monovalent so as to ensure a linear, noncondensed molecular structure.

BRIEF DESCRIPTION OF THE DRAWINGS

The FIGURE is a cross-sectional view of an electro-optic device embodying the invention.

DESCRIPTION OF THE PREFERRED EMBODIMENTS

A typical electro-optical display device embodying the invention is illustrated schematically in the FIGURE and includes two glass or other transparent substrates 2 and 4 having conductive oxide electrodes 6 and 8 thereon. For example, electrodes 6 and 8 may comprise conductive tin oxide, indium oxide or admixtures thereof. Evaporated or otherwise applied onto the oxide electrodes are alignment-promoting layer 10 and 12, for example, thin silicon oxide layers evaporated at an angle of 60°. Glass frit spacers 14 and 16 maintain the substrates 2 and 4 apart to complete the cell. The cell is baked at an elevated temperature to melt the glass frit and seal the cell except for a fill port. The electro-optical composition of the invention is then introduced into the space 18 between the substrates and the fill port sealed. Of course, electrodes 6 and 8 are connected to suitable circuitry to generate the desired electric field across the electrodes to rotate the host liquid crystal molecules and thus the guest dichroic dye molecules to vary the light absorption characteristics of the cell.

The electro-optical composition of the present invention comprises a host liquid crystal and guest dichroic dye admixed together. Preferably the liquid crystal is a nematic material exhibiting strong positive dielectric anisotropy but other liquid crystals, particularly of the cholesteric type, may be employed depending upon the electro-optic effect to be utilized. Low melting point nematic liquid crystals, such as p-alkoxybenzylidene-p'-alkylanilines and their mixtures with other liquid crystals, and mixtures of p-alkoxy-or acyloxybenzylidene-p'-cyanoanilines, having a transition temperature range that includes room temperature, are suitable. Other nematic liquid crystals useful in the invention include, but are not limited to, esters available from Merck Company and Hoffman LaRoche Company, biphenyls from BDH Ltd., phenyl cyclohexanes and azoxy compounds available from Merck Company as well as others. Suitable cholesteric liquid crystals can be made by incorporating optically active compounds in any of the above nematic liquid crystals.

In preparing an electro-optic display device of the invention, the liquid crystal materials should be rigorously purified to remove ionic and nonionic impurities which may react to degrade the liquid crystal compounds by decomposition, transsubstitution reactions and the like. For commercially acceptable devices, the liquid crystal compounds should be purified so that their resistivity is $10''$ ohm-cm or higher.

An important feature of the present invention is that the guest dichroic dye is characterized as a linear, noncondensed aromatic compound including at least one guinonoid ring in the molecular structure as the color generating group (or chromophore). In particular, the inventive dye compound is represented by the formula:

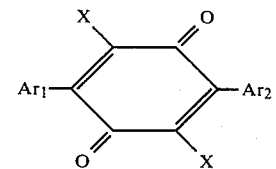

I where $Ar_1$ and $Ar_2$ can be the same or a different mono or polycyclic aromatic radical selected from:

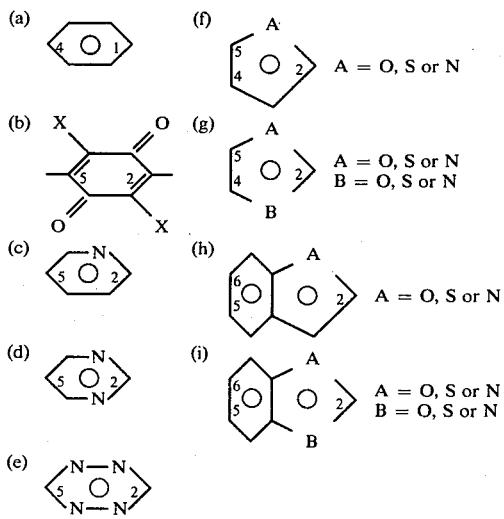

or (j) combinations of two or more of (a) through (i) joined together in a linear, noncondensed structure. For example, when $Ar_1$ or $Ar_2$ comprise only one of (a)–(i), the radical is joined to the central quinonoid ring at a one (para) type ring position in the case of (a) and at a 2 type ring position in the case of radicals (b)–(i). Similarly, when $Ar_1$ or $Ar_2$ comprise the combination of two or more radicals (a)–(i), radical (a) is linked to adjacent radicals at 1, 4 type ring positions, radicals (b), (c), (d) and (e) are linked to adjacent radicals at 2, 5 type ring positions and radicals (f) through (i), when present, are terminal radicals at the end of the dye molecule and are linked to adjacent (a), (b), (c), (d) or (e) radicals at a 2 ring position. Substituent X is a monovalent blocking substitutent, preferably H, Cl, Br, F, alkyl, alkoxy or acyloxy, which is not fused to the adjacent aromatic radical so as to ensure the linear, noncondensed molecular structure of the dye compound.

In certain preferred embodiments, a generally elongated nonionic substitutent preferably alkyl, alkoxy, alkylamino, alkylsulfono, 4-alkylpiperidyl, 4-(trans-4-alkylcyclohexyl) piperidyl or nitro may be substituted on terminal radicals of the dye molecule to increase its length. For example, the terminal radical of the dye molecule may include the generally elongated, nonionic substitutent at a 4 type terminal ring position in the case of radical (a), at a 5 type terminal ring position in the case of radicals (b), (c), (d) and (e), at a 4 or 5 type terminal ring position in the case of radicals (f) and (g) and at a 5 or 6 terminal ring position in the case of (h) and (i). By generally elongated or linear, I mean a nonionic substitutent elongated at least in the long direction of the dye molecule so as to increase the molecule's overall length.

For increased stability of the dye molecule to light, it is preferred to select $Ar_1$ and/or $Ar_2$ from:

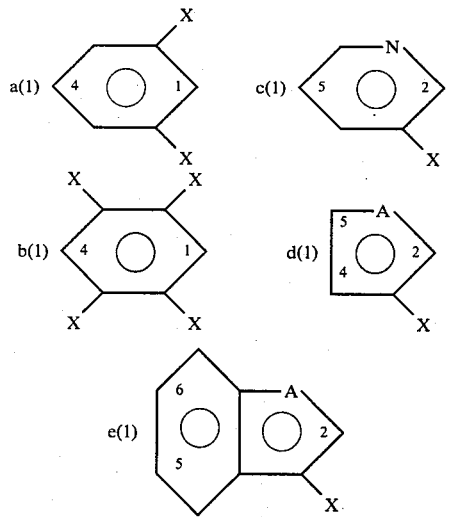

when the radical is joined to the 3, 6 substituted quinonoid ring at a 1 (para) ring position in the case of (a1), at 1 (para) and 4 ring positions in the case of (b1) and at a 2 ring position in the case of (c1), (d1) and (e1), X and A being described hereinabove.

Generally, the dye compound represented by the general formula set forth hereinabove may be referred to as 2, 5-diaryl-1, 4 benzoquinone. The advantageous properties of dyes of this type are attributable to their long, rod-like structure which results in a high order parameter and thus in improved contrast and to the quinonoid ring as the color generating group. These dyes are generally soluble in all the commonly used nematic liquid crystals listed in part hereinabove, and impart a variety of colors, including yellow, red, green, purple, dark gray, black, etc. to a solution thereof (depending on the specific dye compound utilized) when incident light impinges on the dye molecules perpendicular to their long axes. On the other hand, the solution is colorless when incident light impinges parallel to the dye long axes.

An exemplary dichroic dye of the invention where $Ar_1$ or $Ar_2$ does not include additional quinonoid rings is 2-(4-heptyloxyphenyl)-5-(4-(N,N-diethylamino) phenyl)-3, 6-dichlorobenzo-4-quinone represented by the formula:

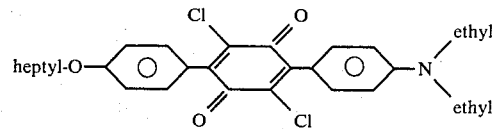

An exemplary synthesis of this dichroic dye involves the following two-step process including:

STEP A:
2-(4-Heptyloxphenyl)-3,6-dichlorobenzo-4-quinone 34 g (0.16 moles) of 4-heptyloxyaniline is dissolved in 41 ml of concentrated hydrochloric acid. The solution is diluted with 25 ml of water and chilled to 5° C. in an ice bath. The solution is treated with a paste consisting of 12.9 g soldium nitrite in 36 ml water with vigorous stirring. When diazotization is completed, it is added simultaneously with 28.4 g of sodium acetate in 50 ml of water to a stirred solution of 25 g (0.14 moles) of 2,5 dichlorobenzo-4-quinone in 780 ml methanol and 210 ml diethyl ether with an additional 25 ml water added to rinse. This mixture is stirred for two hours, then 400 ml of solvent is stripped off and 200 ml boiling water added. The solution is brought to a boil and then filtered hot. On cooling the filtrate precipitated orange crystals are collected by filtration. The precipitated product gives only one spot by TLC. The red tar which is collected in the first filtration proved to be largely product material mixed with some of the diheptyloxyphenyl quinone. This material is purified by recrystallization from ethanol/water.

STEP B: 2-(4-Heptyloxphenyl)-5- -(4-N,N-diethylamino)phenyl)-3,6-dichlorobenzo-4-quinone 16 g (0.089 moles) of N,N-diethyl-p-phenylendiamine is added to 20 ml concentrated hydrochloric acid and chilled in an ice/salt bath to −5° C., then diazotized with a paste consisting of 7 g solution nitrite in 20 ml water. When the diazotization is complete, sufficient sodium acetate is added to buffer the solution to neutrality. The buffered diazo solution is added to a vigorously stirred solution of 4 g (0.011 moles) of the heptyloxyphenyl quinone (Compound A) in 400 ml ethanol and 200 ml of diethyl ether. The red solution immediately begins to darken and bubbles of nitrogen are formed. The reaction mixture is allowed to stand overnight and then is diluted with an equal volume of water. The solution is stripped of alcohol and ether on a vacuum and then extracted with methylene chloride. The extract is dried and stripped to give the crude product. A gross purification is carried out on an open silica gel column using 5% diethyl ether in hexane as the elutant. The product material obtained from this step is further purified using a Waters Association Pres 500 preparative liquid chromatograph with the standard Pred Pak silica cartridge and a 2% ethyl ether/90% hexane elutant. Compound purity is monitored by thin layer chromatrography. Melting point—114° C.

A preferred dichroic dye of the invention where multiple quinonoid rings are present is represented by the formula:

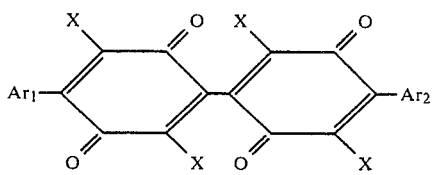

where Ar₁ and Ar₂ can be the same or a different mono or polycyclic aromatic radical selected from:

(a) [benzene ring, positions 4,1]
(b) [pyridine, N at 5,2]
(c) [pyrimidine, N at positions with N, N]
(d) [tetrazole N—N, N—N]
(e) [5-membered ring, position 5-A, 2; A = O, S or N]
(f) [5-membered ring 5-A, 4-B, 2; A = O, S or N; B = O, S or N]
(g) [fused 6-ring with A at position 2; A = O, S or N]
(h) [fused ring with A, B; A = O, S or N; B = O, S or N]

or (i) combinations of two or more of radicals (a) through (h) joined together in a linear, noncondensed structure with linkages between the adjacent radicals as spelled out hereinabove and where X is an defined above. When terminal radicals, Ar₁ and Ar₂ may include at terminal ring positions the aforementioned nonionic substituent generally elongated along the longitudinal axis of the molecule. An exemplary dichroic dye of this type is 5,5'-di 4-(N, N-diethylamino)phenyl-3,3', 6,6'-tetrachloro-2,2' bibenzo-4-quinonyl having the formula:

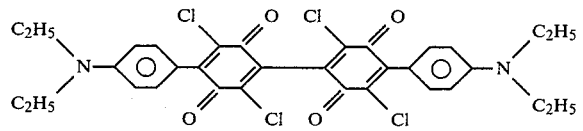

A typical synthesis of this compound also requires two steps as follows:

STEP A: 3,3', 6,6'-tetrachloro-bibenzo-4-quinonyl 10 g. of 2,5-dichlorohydroquinone dimethyl ether is dissolved in 125 ml. of glacial acetic acid with stirring. 15 ml. of 6 N sodium dichromate solution is added dropwise over 10 minutes. The dichromate color is discharged immediately and a green color develops. The solution becomes very warm. The mixture is stirred for ten more minutes, then poured onto 100 g. of an ice/water mixture. The red precipitate formed is collected by filtration and washed with water. The product diquinone is recrystallized from a minimum of ethyl alcohol to yield long red needles. (Melting point—129° C., with considerable sublimation and pretransition polymorphic behavior.) STEP B: 5,5'-Di 4-(N,N-diethylamino)phenyl-3,3', 6,6'-tetrachloro-2,2'-bibenzo-4-quinonyl 3.1 g. (0.028 moles) of N,N-diethylphenylenediamine is dropped into 5 mL. of hydrochloric acid. The amine is diazotised by addition of a paste of 1.33 g. sodium nitrite in 5 mL. water with vigorous stirring. When the diazotisation is complete, sufficient sodium acetate is added to buffer the solution to a PH of approximately 7. The buffered diazo solution is added immediately to a solution of 4.9 g. (0.014) moles of the diquinone (compound A) in 300 mL. ethanol and 250 mL. diethyl ether. The reaction mixture begins to darken immediately and after 30 minutes the solvent is stripped from the mixture under vacuum. Prolonged exposure of the product to the reaction conditions leads to deterioration and reduced yield. The residue remaining after the solvent is removed is dissolved in 50 mL. methylene chloride and passed through silica gel column with methylene chloride elutant so as to remove tars and other gross contaminants. The crude blue product obtained from this step is further purified using a Waters Assoc. Prep 500 preparative liquid chromatograph with the standard Prep Pak silica cartridge and a 15% diethyl ether/85% hexane elutant. Compound purity is monitored by thin layer chromatography. The yield is 0.3 g. of highly purified dye (3.9% yield). Melting point—128°–130° C. with prior softening.

Another particularly preferred dichroic dye of the invention may be referred to as 1,4 di(5 aryl benzo-4-quinon-2yl) benzene having the formula:

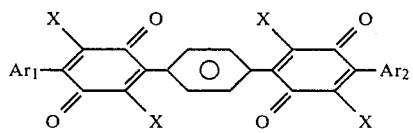

where Ar₁ and Ar₂ as well as X are the same as spelled out for compound II as well as including the same optional generally elongated, nonionic substituent at terminal aromatic radicals. In preferred form, the central benzene ring of compound III is:

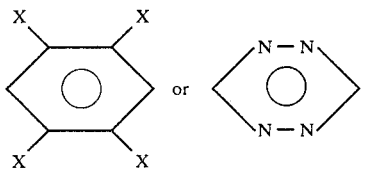

The dichroic dyes of the invention can be admixed with nematic or other liquid crystals to impart a characteristic color thereto under certain alignment conditions. The exact amount of dye admixed in the liquid crystal depends on the solubility of the dye in the liquid crystal and also on the strength of the color desired. In general, an electro-optical composition of the invention will include from about 1% to about 4% by weight of the dichroic dye. For example:

A working display was prepared by dissolution of 3% by weight of 2,5-di(4-heptyloxy phenyl)-3,6 dichlorobenzo-4 quinone in a liquid crystalline mixture composed of 42% 4-heptyl-4' cyanobiphenyl, 23% 4-octyloxy-4'-cyano biphenyl, 19% 4-pentyloxy-4' cyanobiphenyl and 16% 4-heptyloxy-4' cyanobiphenyl.

A display cell such as previously described with a spacing between substrates of 12 microns was filled with material and operated at 3 volts (rms). This gave a working device with white digits on a yellow background.

Similarly a display mixture containing 3% 2-(4-heptyloxyphenyl)-5-(4-(N.N-diethyl amino)phenyl)-3,6-dichlorobenzo 4 quinone in the above liquid crystal composition was filled into a similar display cell and operated at 3 volts (rms) to yield a display with white digits on a green background.
The following table is provided to illustrate in greater detail dichroic dyes of the invention. These examples are for purposes of illustration rather than limitations.
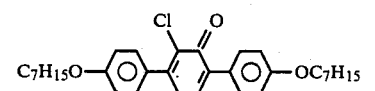
1.
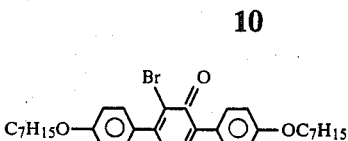
2.
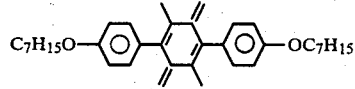
3.
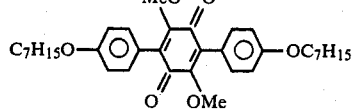
4.
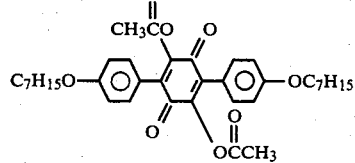
5.
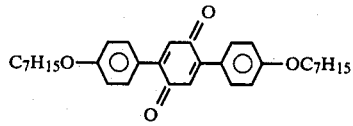
6.
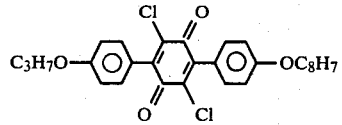
7.
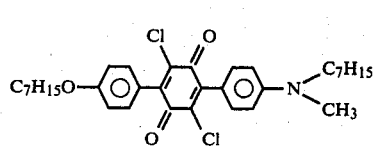
8.
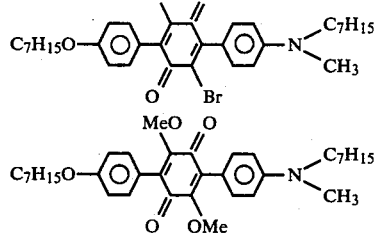
9.
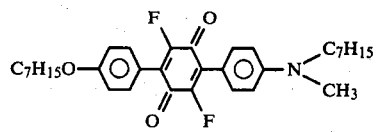
10.
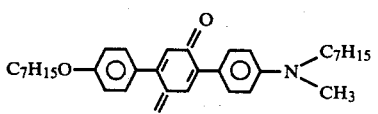
11.
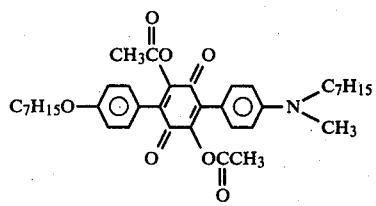
12.
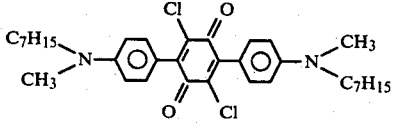
13.
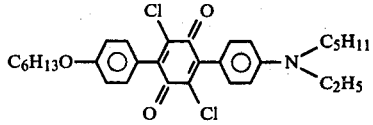
14.
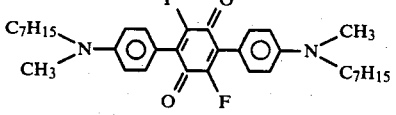
15.
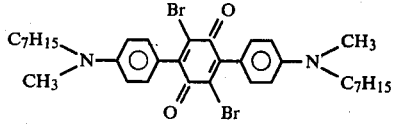
16.
17.
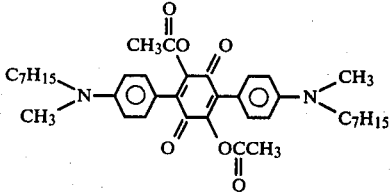
18.
19.
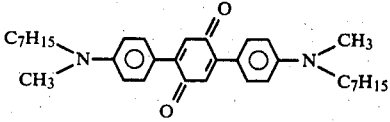
20.
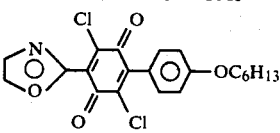
21.
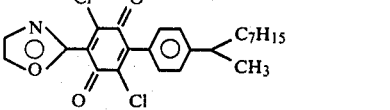
22.

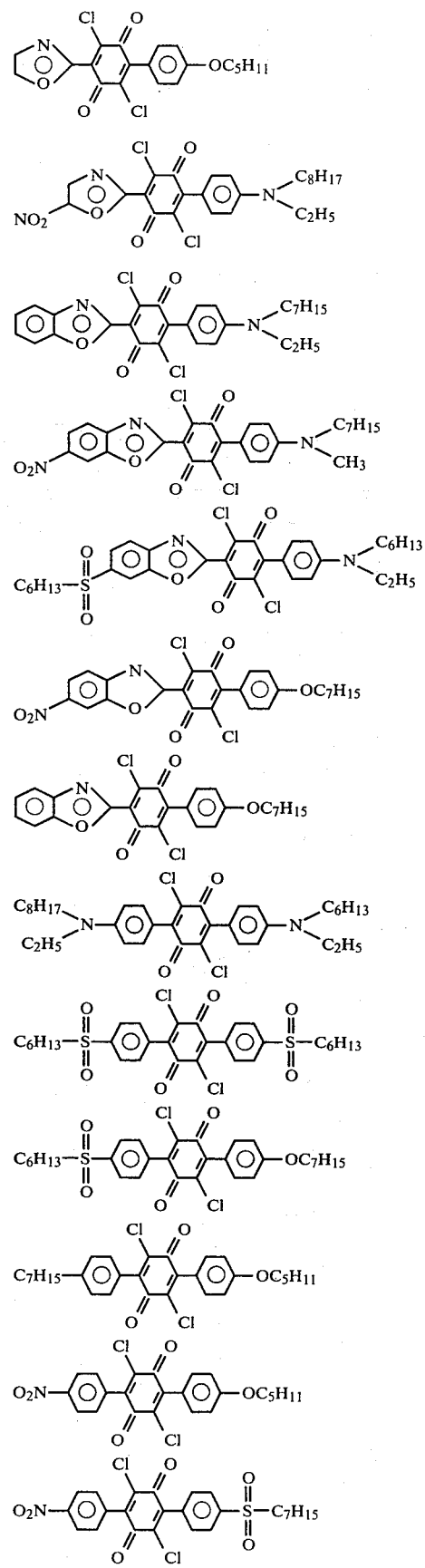

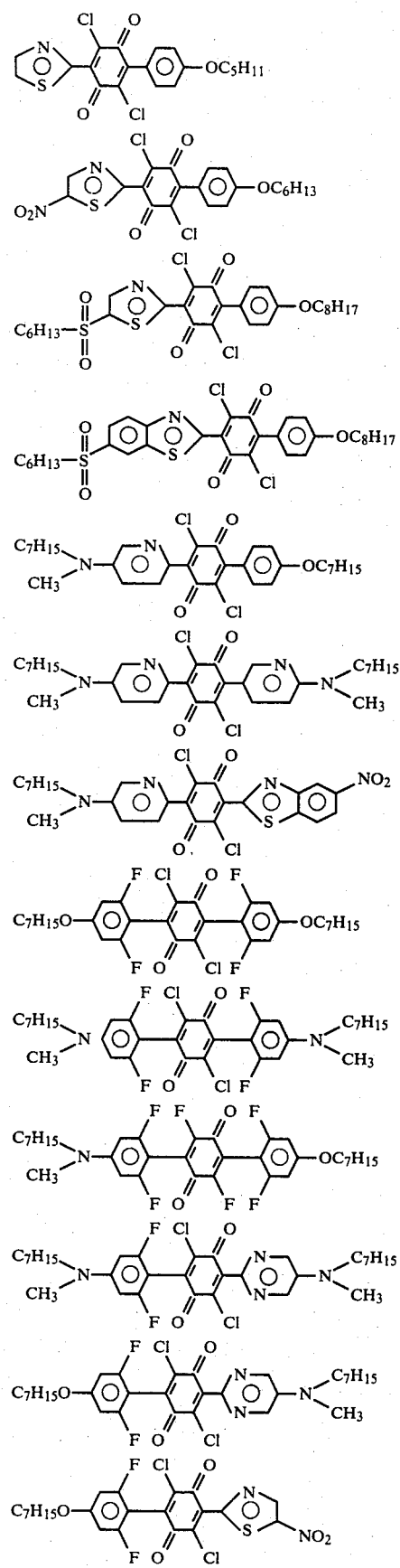

-continued
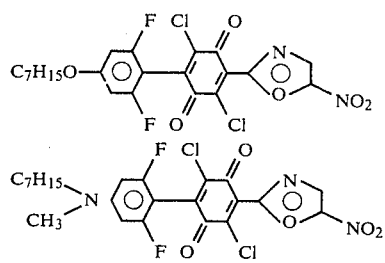
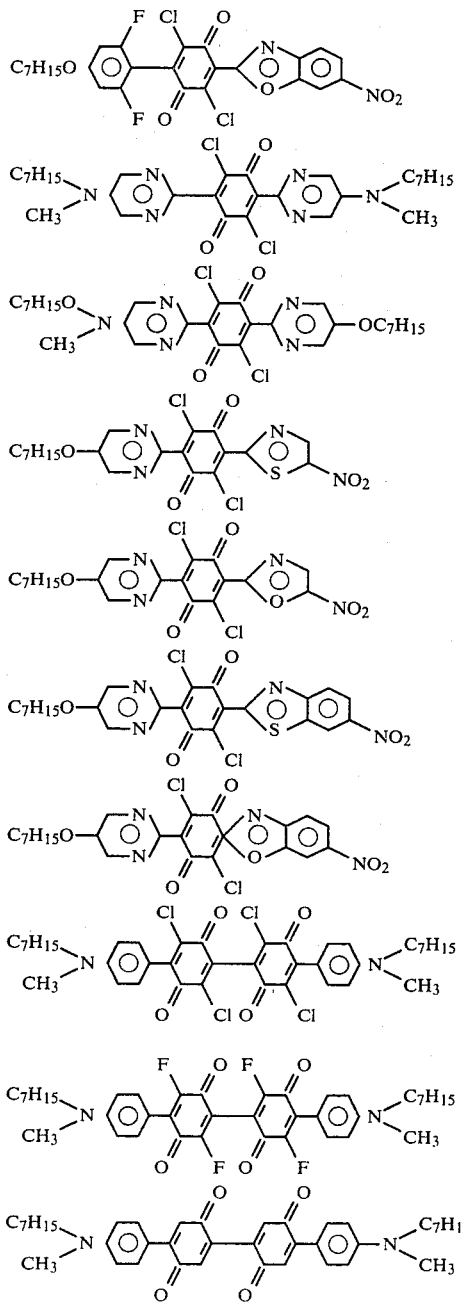
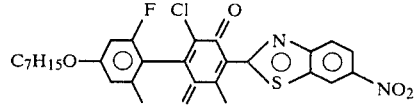
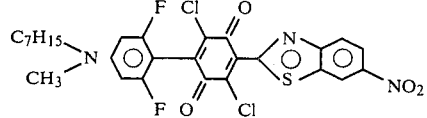
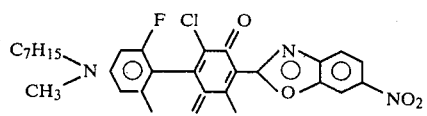
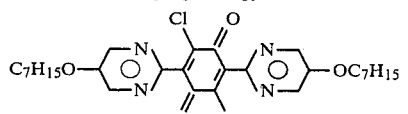
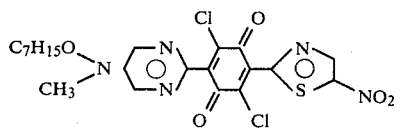
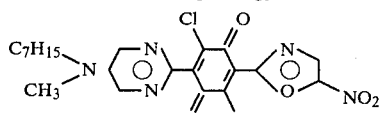
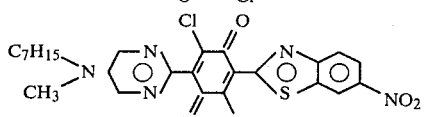
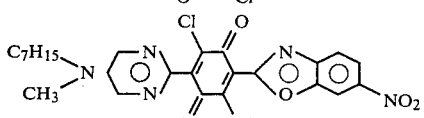
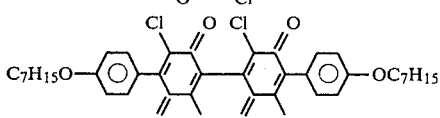
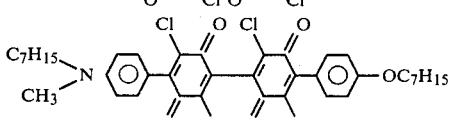
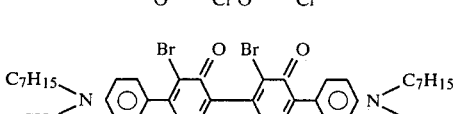
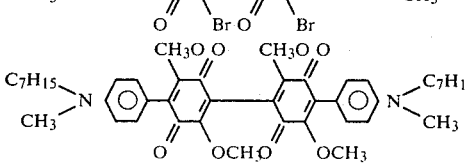

-continued

-continued
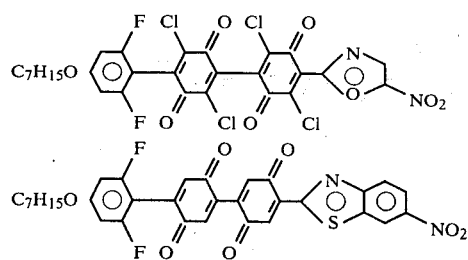
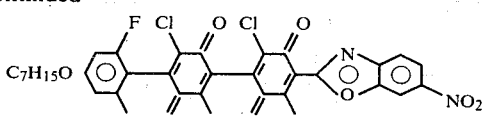
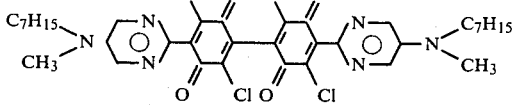
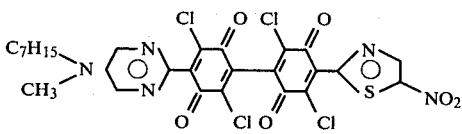
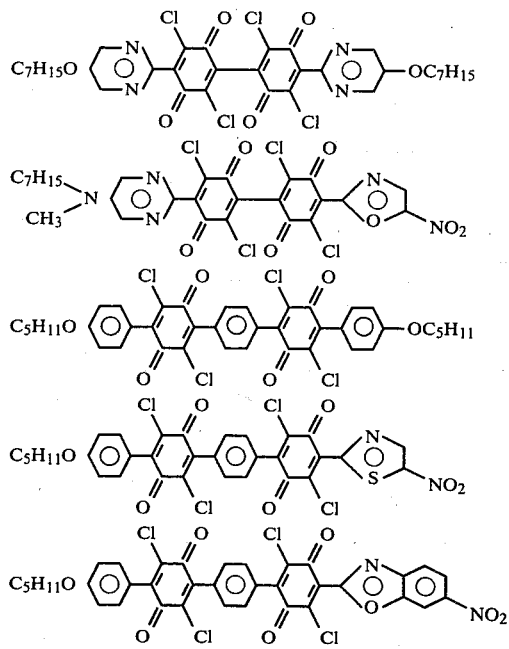
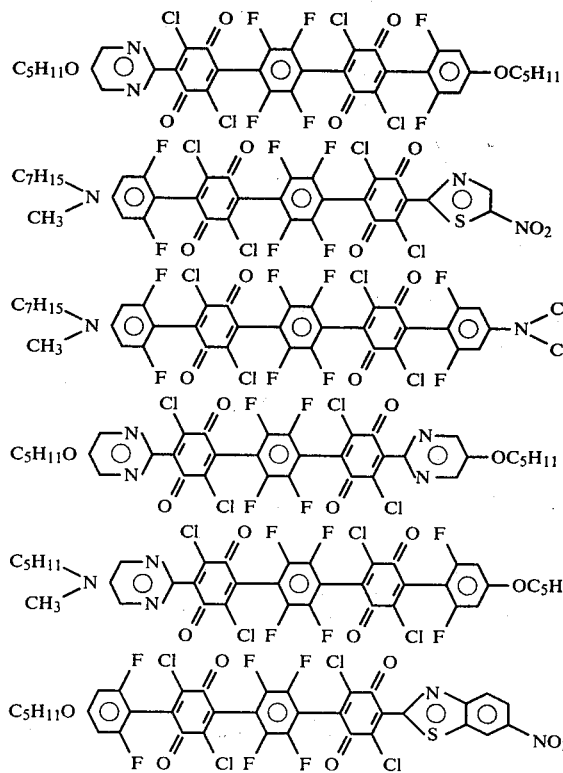

-continued
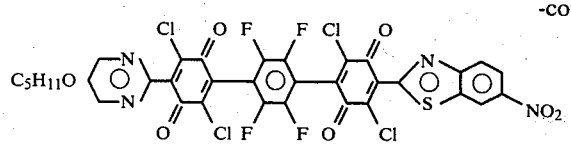
139.
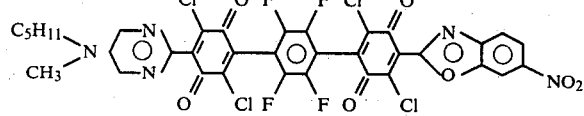
140.
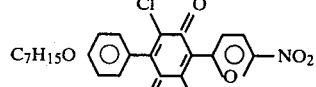
141.
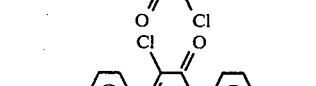
143.
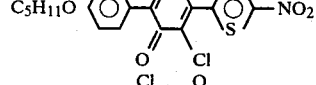
145.
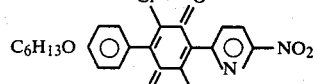
147.
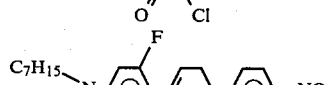
149.
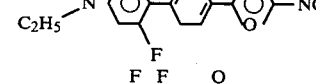
151.
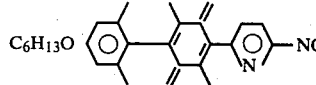
153.
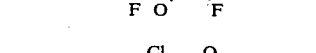
155.
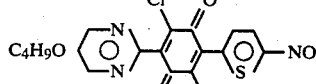
157.
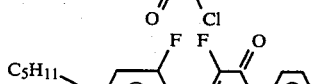
159.
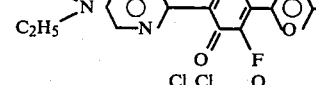
161.
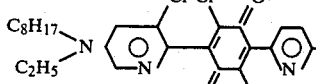
142.
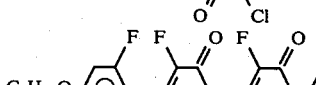
144.
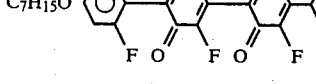
146.
148.
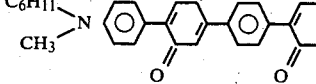
150.
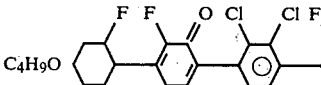
152.
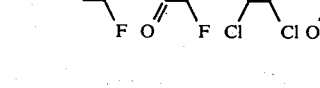
154.
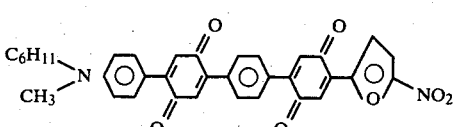
156.
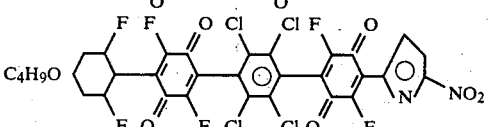
158.
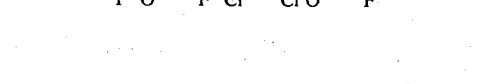
160.
162.

-continued
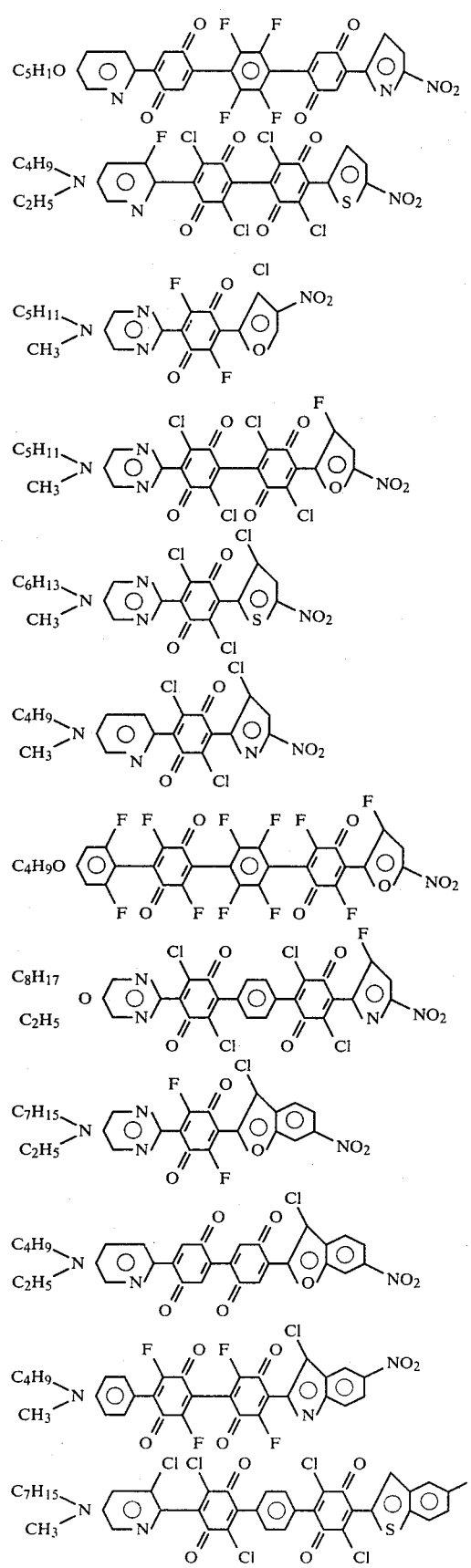
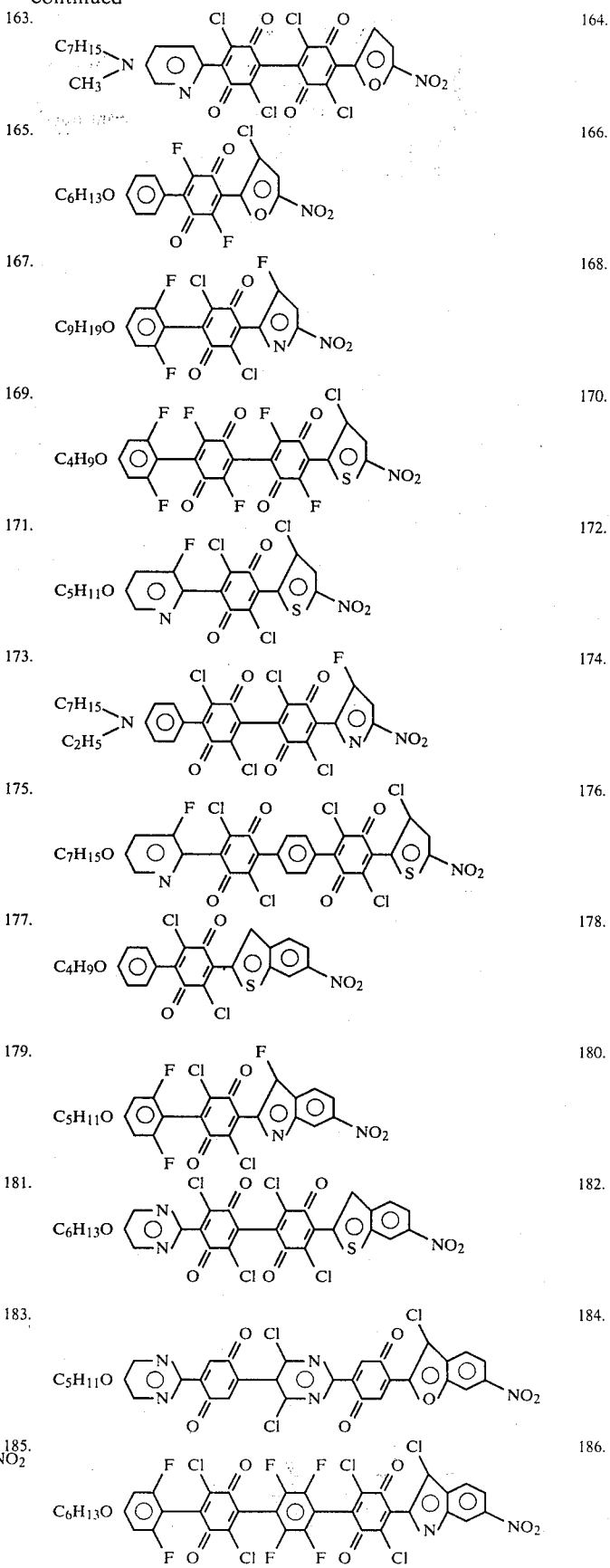

-continued
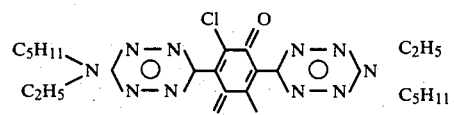 187.
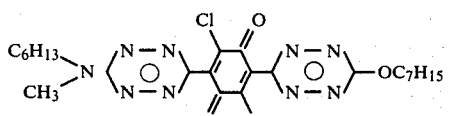 188.
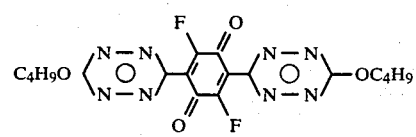 189.
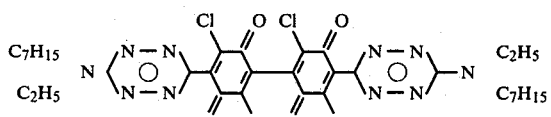 190.
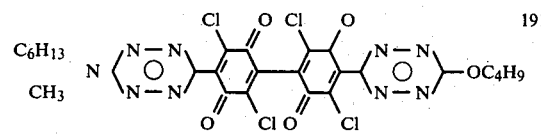 191.
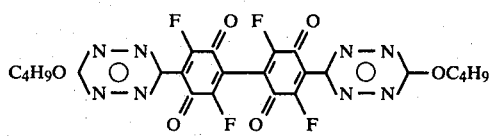 192.
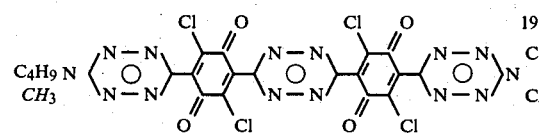 193.
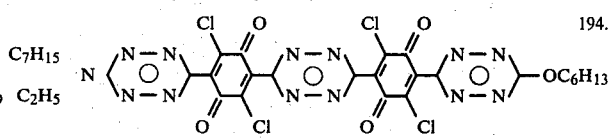 194.
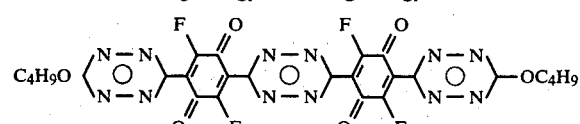 195.
 196.
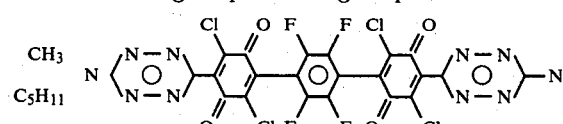 197.
 198.
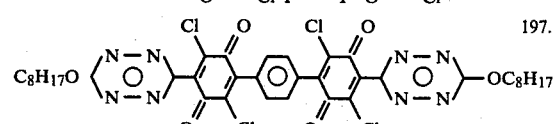 199.
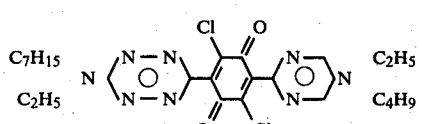 200.
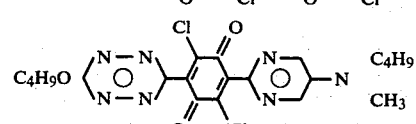 201.
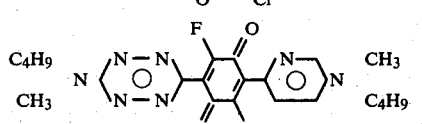 202.
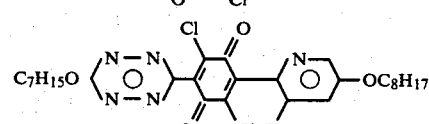 203.
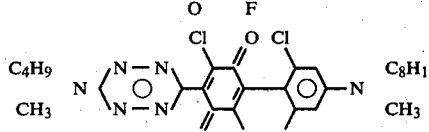 204.
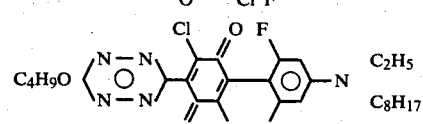 205.
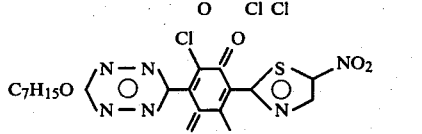 206.
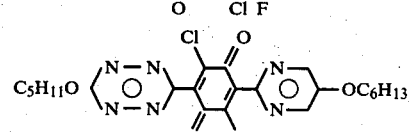 207.
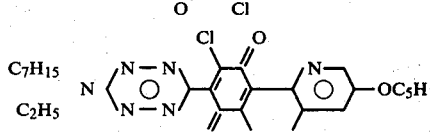 208.
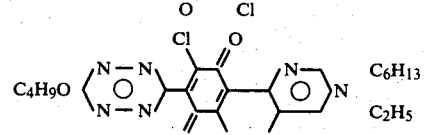 209.
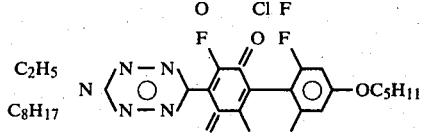 210.
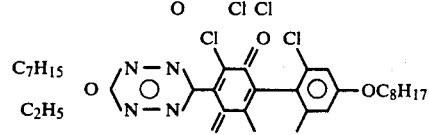
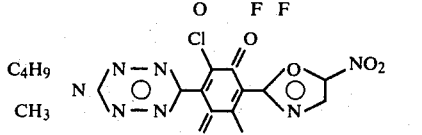

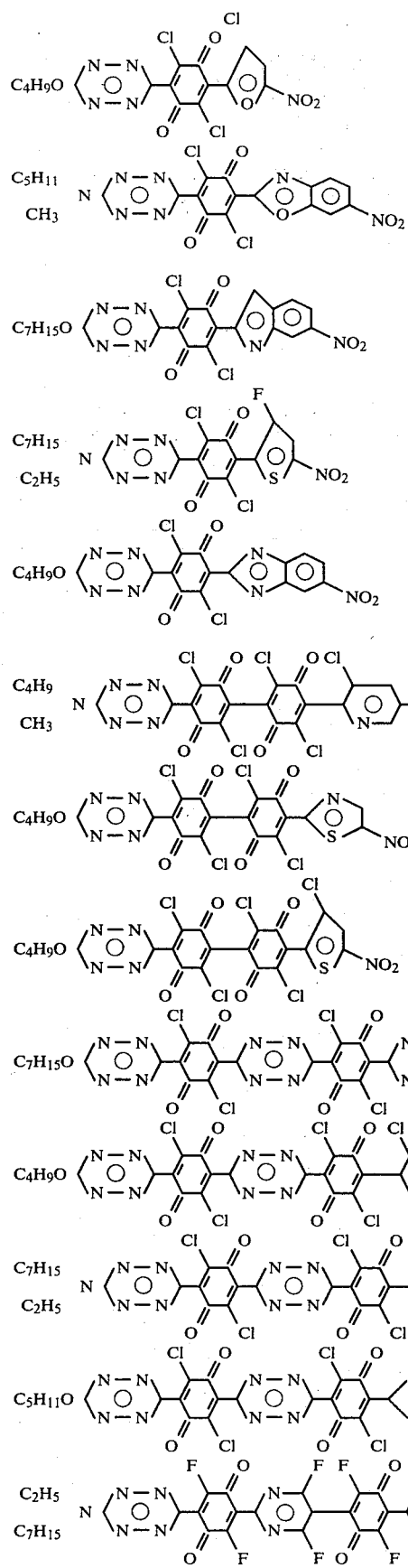

-continued

232.
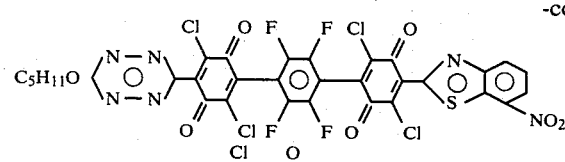

233.
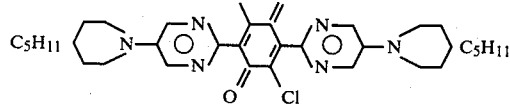

234.
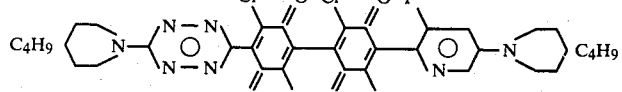

235.
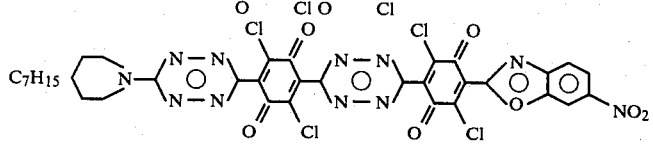

236.
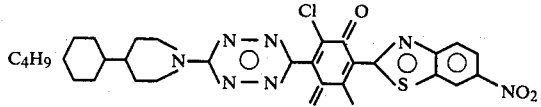

237.
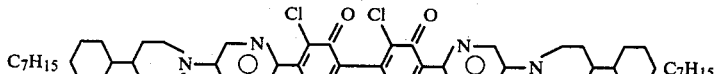

238.
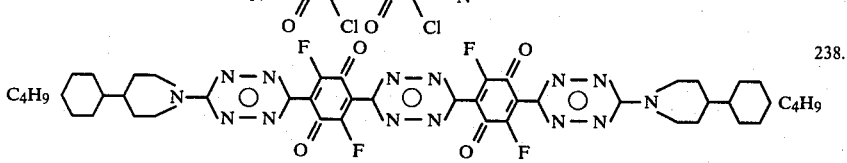

While there has been described what is considered to be the preferred embodiments of the invention, other modifications will occur to those skilled in the art and it is desired to cover in the appended claims all such modifications as fall within the true spirit and scope of the invention.

I claim:

1. An electro-optical composition comprising a host liquid crystal admixed with a linear, noncondensed aromatic guest dichroic dye of the formula:

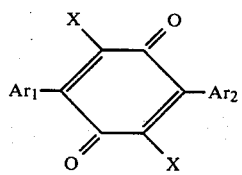

where Ar$_1$ and Ar$_2$ can be the same or a different mono or polycyclic aromatic radical selected from:

(a) 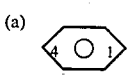

(b) 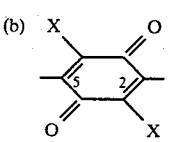

(f) 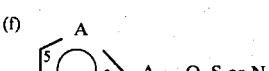 A = O, S or N (g) 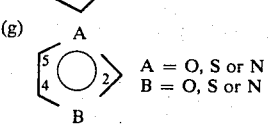 A = O, S or N
B = O, S or N (c) 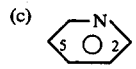

(d) (structure with N, O)

(e) 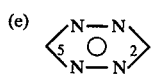

(h) 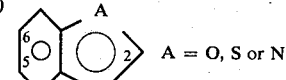 A = O, S or N (i) 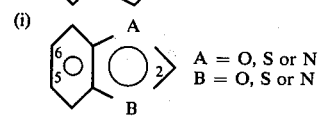 A = O, S or N
B = O, S or N or (j) combinations of two or more of (a)–(i) joined together in a linear, noncondensed structure, with the proviso that when Ar$_1$ or Ar$_2$ comprise only one of (a)–(i), the radical is joined to the quinonoid ring at a 1 (para) type ring position in the case of (a) and at a 2 type ring position in the case of (b)–(i) and that when Ar$_1$ or Ar$_2$ comprise the combination of two or more of (a)–(i), radical (a) is linked to adjacent radicals at 1,4 type ring positions, radicals (b), (c), (d) and (e) are linked to adjacent radicals at 2,5 type ring positions and radicals (f) through (i), when present, are terminal radicals at the end of the dye molecule and are linked to adjacent (a), (b), (c), (d), or (e) radicals at a 2 ring position, and with the further proviso that the terminal radical of the dye molecule may include a generally linear, nonionic substituent at a 4 type terminal ring position in the case of (a), at a 5 type terminal ring position in the case of (b), (c), (d) and (e), at a 4 or 5 terminal ring positions in the case of (f) and (g) and at 5 or 6 terminal ring positions in the case of (h) and (i) and where X is a monovalent blocking substituent which is not fused to the adjacent aromatic radical so as to ensure the linear, noncondensed molecular structure.

2. The composition of claim 1 wherein the aromatic radicals $AR_1$ or $Ar_2$ can also include:

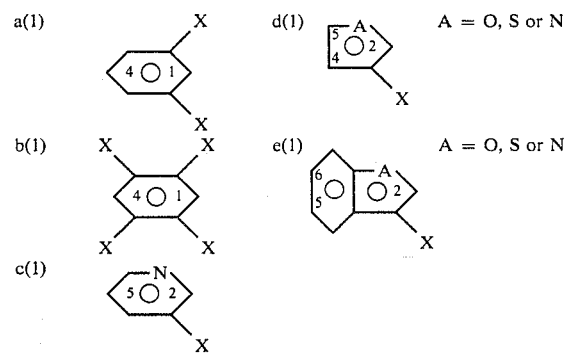

where X is defined in said claim, when the radical is joined to a 3,6 substituent quinonoid ring at a 1(para) type ring position in the case of (a1), at 1 and 4 type ring positions in the case of (b1) and at a 2 ring position in the case of (c1)–(e1).

3. The composition of claim 1 wherein X can be H, Cl, Br, F, alkyl, alkoxy or acyloxy.

4. The composition of claim 1 wherein the generally linear substituent can be alkyl, alkoxy, alkylamino, alkylsulfono, 4-alkylpiperidyl, 4-(trans-4-alkylcyclohexyl) piperidyl or nitro.

5. An electro-optical composition comprising a host liquid crystal admixed with a linear, noncondensed aromatic guest dichroic dye of the formula:

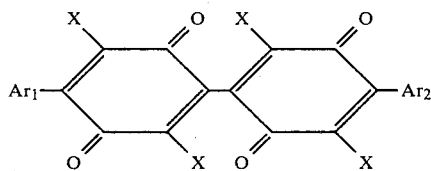

were $Ar_1$ and $Ar_2$ can be the same or different mono or polycyclic aromatic radical selected from:

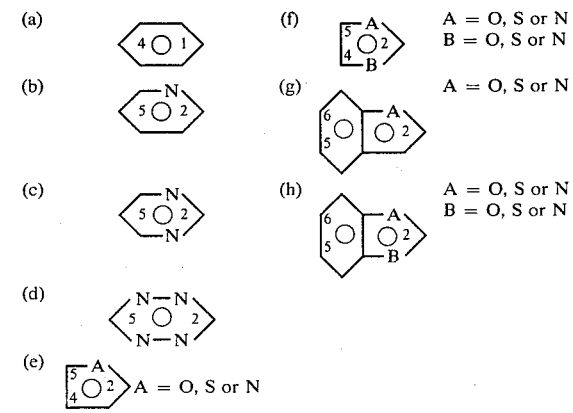

or (i) combinations of two or more of (a)–(h) joined together in a linear, noncondensed structure, with the proviso that when $Ar_1$ or $Ar_2$ comprise only one of (a)–(h), the radical is joined to the quinonoid ring at a 1(para) type ring position in the case of (a) and at 2 ring position in the of (b)–(h) and that when $Ar_1$ or $Ar_2$ comprise the combination of two or more of (a)–(h), radical (a) is linked to adjacent radicals at 1,4 type ring positions, radicals (b), (c) and (d) at 2,5 type ring positions and radicals (e)–(h), when present, are terminal radicals at the end of the dye molecule and are linked to adjacent (a), (b), (c) or (d) radicals at a 2 ring position, and with the further proviso that the terminal radical of the dye molecule may include a generally linear, nonionic substituent at a 4-type terminal ring position in the case of (a), at a 5-type terminal ring position in the case of (b), (c) and (d), at the 4 or 5 terminal ring position in the case of (e) and (f) and at the 5 or 6 terminal ring position in the case of (g) and (h), and where X is a monovalent blocking substituent which is not fused to the adjacent aromatic radical so as to ensure the linear, noncondensed, molecular structure.

6. The composition of claim 5 wherein the aromatic radicals can also include:

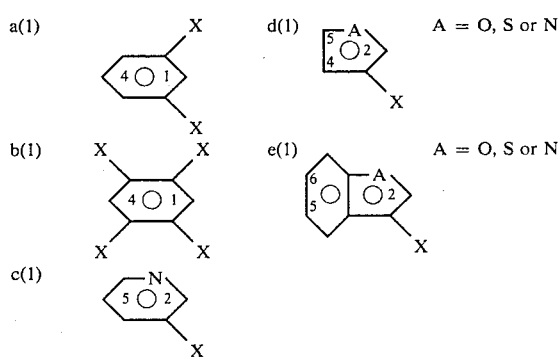

where X is as defined in said claim, when the radical is joined to a 3,6 substituted quinonoid ring at a 1 ring position in the case of (a1), at 1 and 4 ring positions in the case of (b1) and at a 2 ring position in the case of (c1)–(d1).

7. The composition of claim 5 wherein X can be H, Cl, Br, F, alkyl, alkoxy or acyloxy.

8. The composition of claim 5 wherein the generally linear substituent can be from alkyl, alkoxy, alkyl amino, alkylsulfono, 4-alkylpiperidyl, 4-(trans-4-alkylcyclohexyl)piperidyl or nitro.

9. An electro-optical composition comprising a host liquid crystal admixed with a linear, noncondensed aromatic guest dichroic dye of the formula:

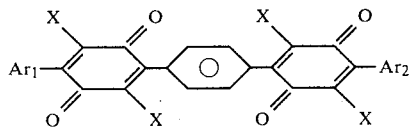

where $Ar_1$ and $Ar_2$ can be the same or a different mono or polycyclic aromatic radical selected from:

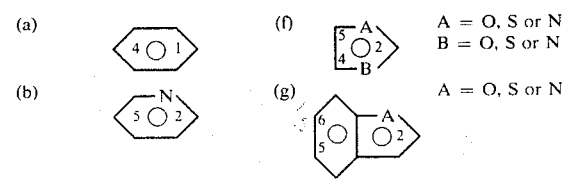

-continued

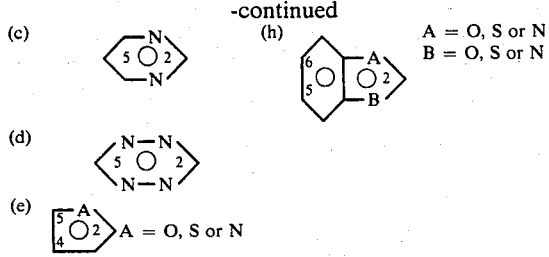

or (i) combinations of two or more (a)–(h) joined together in a linear, noncondensed structure, with the proviso that when Ar$_1$ or Ar$_2$ comprise only one of (a)–(h), the radical is joined to the quinonoid ring at a 1 (para) type ring position in the case of (a) and at a 2 ring position in the case of (b)–(h) and that when Ar$_1$ or Ar$_2$ comprise the combination of two or more of (a)–(h), radical (a) is linked to adjacent radicals at 1, 4 type ring positions, radicals (b), (c) or (d) at 2, 5 type ring positions and radicals (e)–(h), when present, are terminal radicals at the end of the dye molecule and are linked to adjacent (a), (b), (c) or (d) radicals at a 2 ring position, and with the further proviso that the terminal radical of the dye molecule may include a generally linear, nonionic substituent at a 4 type terminal ring position in the case of (a), at a 5 type terminal position in the case of (b), (c) or (d) at the 4 or 5 terminal ring positions in the case of (e) and (f) and at the 5 or 6 terminal ring positions in the case of (g) and (h), and where X is monovalent blocking substituent which is not fused to the adjacent aromatic radical so as to ensure that linear, noncondensed molecular structure.

10. The composition of claim 9 wherein the central benzene ring between the substituted quinonoid rings is:

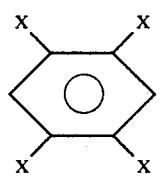

where X is as defined in said claim.

11. The composition of claim 9 wherein X can be H, Cl, Br, F. alkyl, alkoxy or acyloxy.

12. The composition of claim 9 wherein the aromatic radicals can also include:

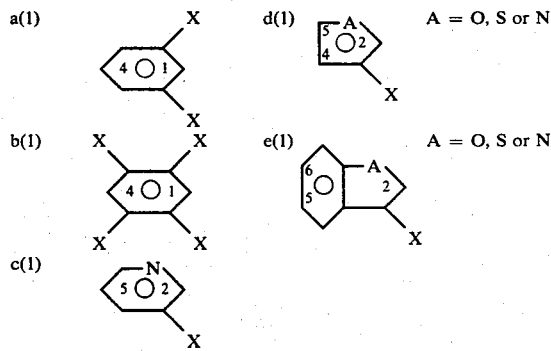

where X is as defined in said claims, when the radical is joined to a 3,6 substituted quinonoid ring at a 1 ring position in the case of (a1), at 1 and 4 ring positions in the case of (b1) and a 2 ring position in the case of (c1)–(e1).

13. The composition of claim 9 wherein the generally linear substituent can be alkyl, alkoxy, alkyl amino, alkylsulfono, 4-alkylpiperidyl, 4-(trans-4-alkylcyclohexyl)piperidyl or nitro.

14. In an electro-optical display device comprising two spaced transparent substrates whose facing surfaces have been coated with transparent electrodes, the improvement comprising an electro-optical composition disposed between the substrates comprising a host liquid crystal admixed with a linear, non-condensed aromatic guest dichroic dye of the formula:

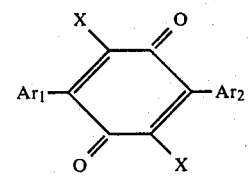

where Ar$_1$ and Ar$_2$ can be the same or a different mono or polycyclic aromatic radical selected from:

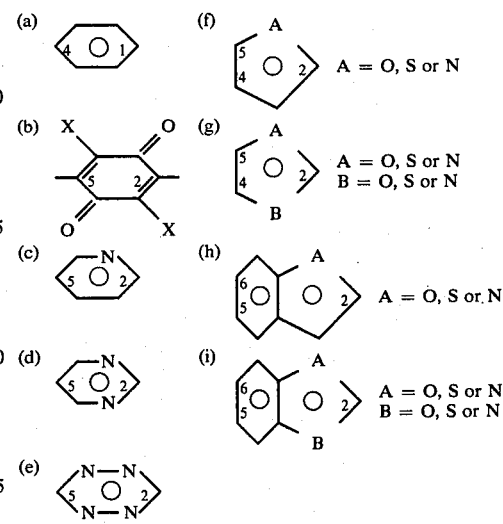

or (j) combinations of two or more of (a)–(i) joined together in a linear, noncondensed structure, with the proviso that when Ar$_1$ or Ar$_2$ comprise only one of (a)–(i), the radical is joined to the quinonoid ring at a 1 (para) type ring position in the case of (a) and at a 2 type ring position in the case of (b)–(i) and that when Ar$_1$ or Ar$_2$ comprise the combination of two or more of (a)–(i), radical (a) is linked to adjacent radicals at 1, 4 type ring positions, radicals (b), (c), (d) and (e) are linked to adjacent radicals at 2, 5 type ring positions and radicals (f)–(i), when present, are terminal radicals at the end of the dye molecule and are linked to adjacent (a), (b), (c), (d), or (e) radical at a 2 ring position, and with further proviso that the terminal radical of the dye molecule may include a generally linear, nonionic substituent at a 4 type terminal ring position in the case of (a), at a 5 type terminal ring position in the case (b), (c), (d) and (e) at a 4 or 5 terminal ring position in the case (f) and (g) and at 5 or 6 terminal ring position in the case of (h) and (i), and where X is a monovalent blocking substituent which is not fused to the adjacent aromatic radical so as to ensure the linear, noncondensed molecular structure.

15. The display of claim 14 wherein the dichroic dye is represented by the chemical formula:

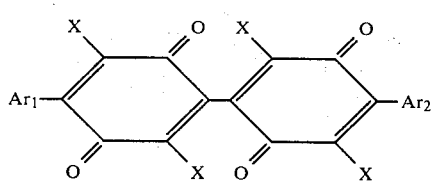

where $Ar_1$ and $Ar_2$ can be the same or a different mono or polycyclic aromatic radical selected from:

(a), (b), (c), (d), (e), (f), (g), (h) [as depicted, with $A = O, S$ or $N$ and $B = O, S$ or $N$ where applicable]

or (i) combinations of two or more of (a)–(i) joined together in a linear, noncondensed structure with the proviso that when $Ar_1$ or $Ar_2$ comprise only one of (a)–(h), the radical is joined to the quinonoid ring at a 1 (para) type ring position in the case of (a) and at a 2 ring position in the case of (b)–(h) and that when $Ar_1$ or $Ar_2$ comprise the combination of two or more of (a)–(h), radical (a) is linked to adjacent radicals at 1,4 type positions, radicals (b), (c) and (d) at 2, 5 type ring positions and radicals (e)–(h), when present, are terminal radicals at the end of the dye molecule and are linked to adjacent (a), (b), (c) or (d) radicals at a 2 ring position, and with the further proviso that the terminal radical of the dye molecule may include a generally linear, nonionic substituent at a 4 type ring position in the case of (a), at a 5 type position in the case of (b), (c) and (d) at the 4 or 5 type terminal position in the case of (e) and (f) and at the 5 or 6 type terminal position in the case of (g) and (h), and where X is a monovalent blocking substituent which is not fused to the adjacent aromatic radical so as to ensure the linear, noncondensed molecular structure.

16. The display of claim 14 wherein the dichroic dye is represented by the chemical formula:

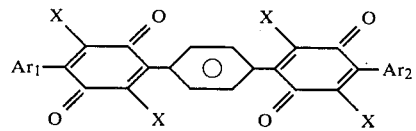

where $Ar_1$ and $Ar_2$ can be the same or a different mono or polycyclic aromatic radical selected from:

(a), (b), (c), (d), (e), (f), (g), (h) [as depicted, with $A = O, S$ or $N$ and $B = O, S$ or $N$ where applicable]

or (i) combinations of two or more of (a)–(h) joined together in a linear, noncondensed structure, with the proviso that when $Ar_1$ or $Ar_2$ comprise only one of (a)–(h), the radical is joined to the quinonoid ring at a 1 (para) type ring position in the case of (a) and at a 2 ring position in the case of (b)–(h) and that when $Ar_1$ or $Ar_2$ comprise the combination of two or more of (a)–(h), radical (a) is linked to adjacent radicals at 1, 4 type ring positions, radicals (b), (c) and (d) at 2,5 type ring positions and radicals (e)–(h), when present, are terminal radicals at the end of the dye molecule and are linked to adjacent (a), (b), (c) or (d) radicals at a 2 ring position, and with the further proviso that the terminal radical of the dye molecule may include a generally linear, nonionic substituent at a 4 type terminal ring position in the case of (a), at a 5 type terminal position in the case of (b), (c) and (d) at the 4 or 5 type terminal positions in the case of (e) and (f) and at the 5 or 6 type terminal position in the case of (g) and (h), and where X is a monovalent blocking substituent which is not fused to the adjacent aromatic radical so as to ensure the linear, noncondensed molecular structure.

* * * * *